UNITED STATES PATENT OFFICE.

MAX JOSEPH FUNCKE, OF EIKELSKAMP, PRUSSIA, ASSIGNOR TO RUDOLPH BONINGER AND GUSTAVA BONINGER.

IMPROVEMENT IN THE PROCESS OF MANUFACTURING SULPHATE OF ALUMINA.

Specification forming part of Letters Patent No. 1,945, dated January 23, 1841; antedated November 16, 1839.

*To all whom it may concern:*

Be it known that I, MAX JOSEPH FUNCKE, a subject of the King of Prussia, residing at Eikelskamp, in the circuit of the government to Dusseldorf, in the said Kingdom, have invented an Improvement in the Manner or Process of Manufacturing Sulphate of Alumina, so as to produce the same free, or very nearly free, from iron and from alkali, whereby it is more perfectly adapted to be used as a mordant or for other purposes in the useful arts than the alum of commerce, or than the sulphate of alumina as ordinarily prepared; and I do hereby declare that the following is a full, and exact description thereof.

I take potter's clay, pipe-clay, or clay of any other kind as free from iron as it can possibly be obtained, and this I dry at such degree of heat as is necessary to drive off all its free moisture. The clay so calcined is next to be reduced to powder, and this powder I put into suitable leaden vessels or vessels of other material not acted upon by sulphuric acid. To these vessels a moderate degree of heat is to be applied by means of steam or otherwise. Sulphuric acid of 66° Baumé is then to be added to the clay in such quantity as shall suffice to dissolve nearly the whole of the alumina contained in the clay which may be ascertained by a previous test on a small quantity. An excess of acid should not be used, as the whole ought to be perfectly neutralized by the alumina. After the addition of the acid the mass in the pans is to be stirred until it is perfectly dry. Boiling water is then to be added in sufficient quantity to dissolve the whole of the salt. The liquid thus obtained is to be placed in vats and to remain at rest until it becomes perfectly clear. It should then be tested by means of lime-water, to be certain that it does not contain any free acid, and should any be present lime-water is to be added until the whole excess of acid has combined with the lime and has been precipitated in the form of sulphate of lime. When perfectly clear the liquor is to be drawn off into other vats preparatory to the separating from it the iron, which will always be found combined with it in a greater or less quantity. A measured portion of this liquid—say one pint—is then to be taken and the iron contained in it is to be precipitated by means of a solution of prussiate of potash in such manner as to ascertain the exact quantity of said solution necessary to the precipitation of the contained iron The quantity of liquid contained in the vat being known, the portion of the solution of prussiate of potash necessary to the precipitation of the whole of the iron will consequently be known and this is to be added to it, the mixture stirred, and the prussiate of iron formed allowed to fall to the bottom. The liquid is then to be drawn off clear from the precipitate and a pure, or nearly pure, solution of sulphate of alumina will be thus obtained, and it may in this state be applied to various purposes in the arts.

If desired, the water may be quickly evaporated in leaden or other vessels, until a pellicle appears on its surface, when it may be put into suitable forms and allowed to cool and crystallize or consolidate.

I am aware that clay has been heretofore treated with sulphuric acid to form a sulphate of alumina; and I am also aware that it is known to every chemist that iron may be precipitated from its solution in sulphuric or other acid by means of prussiate of potash. I do not therefore make any claim to the discovery of either of these processes when taken alone; but I do claim—

The combination of means herein pointed out for the manufacturing of sulphate of alumina, by which it is produced with greater facility, and in a state of greater purity than by any of the processes heretofore adopted in its manufacture—that is to say, I claim, in combination, the preparing of the clay by desiccation, the combining thereof with sulphuric acid, and the subsequent solution and precipitation of the iron, substantially in the manner and for the purpose herein fully made known.

I will here observe that although I have pointed out a solution of the prussiate of potash as the article by which the iron is to precipitate, I have done so because I esteem this as the best mode of attaining the end desired; but I do not intend hereby to limit or confine myself to the use of this salt, but to use any other of the known reagents by which a similar result may be attained, and a sulphate of alumina free, or nearly free, from alkali and from iron be produced.

MAX JOSEPH FUNCKE.

Witnesses:
M. E. MATTHES,
FRIEDRICH GARTRICH.